United States Patent
Simmet et al.

(10) Patent No.: US 10,122,206 B2
(45) Date of Patent: Nov. 6, 2018

(54) DEVICES, SYSTEMS AND METHODS FOR EMERGENCY LIGHT OPERATION

(71) Applicant: TRIDONIC GMBH & CO KG, Dornbirn (AT)

(72) Inventors: Armin Simmet, Amtzell (DE); Ian Wilson, Sunderland (GB); John Kears, Durham (GB); Stephen Parkes, Durham (GB); Simon Maier, Feldkirch (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 94 days.

(21) Appl. No.: 15/129,006

(22) PCT Filed: Mar. 18, 2015

(86) PCT No.: PCT/AT2015/050071
§ 371 (c)(1),
(2) Date: Sep. 26, 2016

(87) PCT Pub. No.: WO2015/143466
PCT Pub. Date: Oct. 1, 2015

(65) Prior Publication Data
US 2017/0110905 A1 Apr. 20, 2017

(30) Foreign Application Priority Data

Mar. 26, 2014 (AT) .................. GM137/2014
Mar. 26, 2014 (DE) .......... 10 2014 205 646

(51) Int. Cl.
*H02J 9/02* (2006.01)
*H05B 33/08* (2006.01)
(Continued)

(52) U.S. Cl.
CPC .................. *H02J 9/02* (2013.01); *F21S 9/022* (2013.01); *H02J 9/065* (2013.01);
(Continued)

(58) Field of Classification Search
CPC .................................... F21S 9/022; H02J 9/02
See application file for complete search history.

(56) References Cited

U.S. PATENT DOCUMENTS

| 4,150,302 A | 4/1979 | Roche |
| 7,218,056 B1 | 5/2007 | Harwood |

(Continued)

FOREIGN PATENT DOCUMENTS

| DE | 2747173 | 4/1979 |
| EP | 0537651 | 4/1993 |

(Continued)

OTHER PUBLICATIONS

Austria Search Report for parent Austrian Application GM 137/2014 dated Feb. 23, 2015.

(Continued)

*Primary Examiner* — Fritz M Fleming
(74) *Attorney, Agent, or Firm* — Andrus Intellectual Property Law

(57) ABSTRACT

The invention relates to an operating device (10) for at least one light-emitting diode (9) having an input (11) for coupling to a DC bus (6) in order to receive a DC supply voltage. The operating device (10) has a configurable emergency light function. The operating device (10) is designed to produce, in the emergency light case, the LED currently for the at least one light-emitting diode (9) in dependence on how the emergency light function is configured.

15 Claims, 5 Drawing Sheets

(51) Int. Cl.
*H05B 37/02* (2006.01)
*H02J 9/06* (2006.01)
*F21S 9/02* (2006.01)
*F21Y 115/10* (2016.01)

(52) U.S. Cl.
CPC ..... *H05B 33/0809* (2013.01); *H05B 33/0842* (2013.01); *H05B 33/0845* (2013.01); *H05B 33/0887* (2013.01); *H05B 37/0227* (2013.01); *F21Y 2115/10* (2016.08)

(56) References Cited

U.S. PATENT DOCUMENTS

| | | | |
|---|---|---|---|
| 9,755,455 B2 * | 9/2017 | Schmucki | H05B 37/0254 |
| 2006/0146553 A1 * | 7/2006 | Zeng | B60Q 11/002 |
| | | | 362/488 |
| 2008/0024010 A1 | 1/2008 | Romano | |
| 2008/0092800 A1 | 4/2008 | Smith et al. | |
| 2013/0147397 A1 | 6/2013 | McBryde et al. | |

FOREIGN PATENT DOCUMENTS

| | | | | |
|---|---|---|---|---|
| EP | 1953894 A2 * | 8/2008 | | H02J 9/02 |
| WO | 0049700 | 8/2000 | | |
| WO | 2009103386 | 8/2009 | | |

OTHER PUBLICATIONS

PCT International Search Report for parent PCT Application PCT/AT2015/050071 dated May 29, 2015.

\* cited by examiner ent application is the U.S. national stage application of International Application PCT/AT2015/050071, filed Mar. 18, 2015, which international application was published on Oct. 1, 2015 as International Publication WO 2015/143466 A1. The International Application claims priority of Austria Patent Application GM137/2014 filed Mar. 26, 2014 and German Patent Application 10 2014 205 646.2 filed Mar. 26, 2014.

DEVICES, SYSTEMS AND METHODS FOR EMERGENCY LIGHT OPERATION

CROSS REFERENCE TO RELATED APPLICATION

The present application is the U.S. national stage application of International Application PCT/AT2015/050071, filed Mar. 18, 2015, which international application was published on Oct. 1, 2015 as International Publication WO 2015/143466 A1. The International Application claims priority of Austria Patent Application GM137/2014 filed Mar. 26, 2014 and German Patent Application 10 2014 205 646.2 filed Mar. 26, 2014.

FIELD OF THE INVENTION

The invention relates to an emergency light operation of light sources. In particular, the invention relates to operating devices, lamps, systems and methods for an emergency light operation, where the operating device for the light source is configured for connection to a direct current (DC) bus.

BACKGROUND

Conventionally, operating devices for light emitting diodes (LEDs) or other light sources are frequently designed to couple to an alternating current (AC) supply source as input, and provide a direct current or direct voltage for the light source at their output. However, operating devices that are designed to receive a DC supply voltage have become increasingly attractive recently. For simplification and savings in costs, it is possible to provide a central processing unit that generates a DC supply voltage and supplies said voltage to an operating device or numerous operating devices via a DC bus. The operating devices are provided separately from the central processing unit, and connected to the central processing unit via the DC bus.

In numerous applications, in particular for a building lighting system, the use of emergency lighting is necessary or desirable. Emergency lighting can be designed as emergency exit lighting, which in an emergency, in particular with a power supply system outage, is intended to enable the exiting of rooms. Emergency lighting can function as an anti-panic lighting system, or function as replacement lighting to enable the temporary continuation of work procedures in order to bring the procedures to a safe completion.

In order to provide emergency lighting in lighting systems based on light emitting diodes (LEDs), specific LED modules can be created, which differ from the LED modules used in normal operation, and which can be activated in an emergency light situation. The use of specific emergency light LED modules may be accompanied with disadvantages with regard to costs and requirements pertaining to installation space.

There is a desire for devices, systems and methods, with which emergency light operation can be provided in an efficient manner. In particular, there is a desire for devices, systems, and methods, with which emergency light operation can be provided in a simple manner with a lighting system having a DC bus for supplying operating devices.

SUMMARY OF THE INVENTION

According to exemplary embodiments of the invention, it is provided that an operating device for at least one light emitting diode has a configurable emergency light function. The configurability sets, e.g., whether or not the corresponding operating device is to continue to provide an LED current for the LEDs connected at the output in an emergency light situation. The operating device can be designed such that even in an emergency light situation, the operating device is supplied with a DC supply voltage via a DC bus. This allows for the use of a central energy storage unit for numerous lamps, which in an emergency provides the DC supply voltage at the DC bus. The service costs for decentralized energy storage units for an emergency light operation can be reduced in this manner.

An operating device for at least one light emitting diode according to one exemplary embodiment is designed to be coupled to a DC bus for receiving a DC supply voltage. The operating device can be supplied with power, both in normal operation as well as in an emergency light situation, via the DC bus. As mentioned, the operating device has a configurable emergency light function. The operating device is configured to generate the LED current for the at least one light emitting diode in an emergency light situation, depending on how the emergency light function is configured.

An operating device of this type can be supplied with power from a central energy storage unit via the DC bus in an emergency light situation. The configurability enables a classification, e.g. in the installation of the operating device or the lamp containing the operating device indicating whether the corresponding operating device is to also supply power in an emergency light situation for the at least one light emitting diode to emit light.

In one system, operating devices that are identical in terms of their construction, having differently configured emergency light functions, can be used in order to implement lamps that only emit light in normal operation, as well as lamps that emit light in an emergency light situation. A determination of the manner of functioning in an emergency light situation, and optionally in normal operation as well, can be achieved with the configurable emergency light function.

As a result of the configurability of the emergency light function, just a portion of numerous operating devices can be selectively assigned the duty of also supplying the allocated light emitting diodes with an LED current. As a result, energy consumption can be reduced in an emergency light situation, and the emergency light function can also be maintained with smaller central energy storage units for the time period required for safety reasons.

The operating device can be designed such that the configured emergency light function is retained. By reconfiguring it, an indication of whether the corresponding operating device is also intended to supply the at least one light emitting diode with a current supply can be enabled.

It can be possible to establish, via the configurable emergency light function, whether the operating device is to provide the LED current in an emergency light situation.

The emergency light function can be configurable via at least one circuit element of the operating device. This enables a simple determination, e.g., through manual manipulation of the circuit element of whether the operating device is to generate the LED current in an emergency light situation.

The at least one circuit element can be a jumper that can be selectively inserted or removed to determine whether or not the operating device provides the LED current in an emergency light situation.

The at least one circuit element can be a resistor that can be set to at least two different values by a user to determine whether or not the operating device is to provide the LED current in an emergency light situation.

The at least one circuit element can be a capacitor that can be set to a least two different values by a user to determine whether or not the operating device is to provide the LED current in an emergency light situation.

The at least one circuit element can be read out by an integrated semiconductor circuit controlling the operating device. The integrated semiconductor circuit can be a microcontroller, a controller, a microprocessor, a processor, or an application-specific integrated circuit (ASIC). By way of example, the integrated semiconductor circuit can determine whether the jumper has been inserted, or the value that the adjustable resistor or adjustable capacitor has been set to.

The emergency light function can also be configured through programming via an interface.

The operating device can have an interface for receiving a command with which the emergency light function is configured. The input that the operating device is connected to the DC bus in the installed state can serve as the interface through which the emergency light function is configured. An interface provided only for programming the operating device can serve as the interface through which the emergency light function is configured, as well. Also, a sensor interface, via which the operating device is connected to a sensor, e.g. a temperature sensor, when in the installed state, can be used as the interface through which the emergency light function is configured.

The operating device can comprise an integrated semiconductor circuit designed to detect the emergency light situation and to control the operating device in the emergency light situation depending on how the emergency light function is configured.

The integrated semiconductor circuit can be connected to the input and can be designed to detect the emergency light situation by monitoring a voltage at the input.

The operating device can comprise a DC/DC converter with a controllable switch. The integrated semiconductor circuit can be designed to switch the controllable switch in a clocked manner in the emergency light situation, in order to provide the LED current when the emergency light function is configured for the operating device to provide the LED current in an emergency light situation.

In an emergency light situation, the operating device can generate an LED current with a lower amperage than in the normal operation. The integrated semiconductor circuit can be designed to switch the controllable switch in a clocked manner in the emergency light situation such that the LED current is reduced in comparison with the normal operation.

When the operating device is configured to provide the LED current in an emergency light situation, the integrated semiconductor circuit can control the operating device such that the LED current for the at least one light emitting diode is generated both in the normal operation as well as in the emergency light situation.

A lamp according to an exemplary embodiment comprises an operating device according to an exemplary embodiment and at least one light emitting diode connected to an output of the operating device.

The lamp can be designed as a lamp for a building lighting system. The lamp can be a wall or a ceiling lamp.

A lighting system according to an exemplary embodiment comprises a DC bus, at least one operating device according to an exemplary embodiment connected to the DC bus, and a DC voltage source to provide the supply voltage at the DC bus in an emergency light situation.

The lighting system can comprise numerous operating devices according to one exemplary embodiment. The emergency light functions of the numerous operating devices can be configured such that only a portion of the operating devices connected to the DC bus generate the LED current in the emergency light situation. As a result, the power consumption is reduced in an emergency light situation, and the time period during which the emergency lighting can be maintained can be extended.

The DC voltage source for the emergency light situation can comprise a battery or a rechargeable battery.

The lighting system can comprise a central processing unit, which comprises a supply circuit for providing the DC supply voltage during normal operation. The supply circuit can comprise at least one AC/DC converter, a power factor correction circuit and a galvanic separation. The battery can be connected to the supply circuit. In normal operation, the battery can be charged, if it is not fully charged. In an emergency light situation, the battery can be selectively connected to the DC bus to provide the DC supply voltage at the DC bus. A clocked DC/DC converter can be interconnected between the battery and the DC bus, in order to adjust the DC supply voltage to a desired voltage in an emergency light situation.

The emergency light situation can be an AC voltage source outage, e.g. a supply voltage outage.

With a method for an emergency light operation of at least one light emitting diode, an operating device is used according to one exemplary embodiment, which has an input for coupling to a DC bus for receiving a DC supply voltage. The operating device has a configurable emergency light function. The method comprises a detection of an emergency light situation. The operating device selectively provides an LED current to the at least one light emitting diode, depending on how the emergency light function of the operating device is configured. The operating device is provided with the DC supply voltage via the DC bus in the emergency light situation.

The operating device can detect the emergency light situation, for example, by monitoring a voltage level at the DC bus. A change in the voltage level in an emergency light situation in relation to the normal operation can be detected. Alternatively or additionally, an AC signal transmitted via the DC bus and modulated to the DC supply voltage can be read out by the operating device, which signal indicates that there is an emergency light situation.

Features of the method according to other exemplary embodiments and the respective effects achieved therewith, correspond to the designs described in reference to the operating devices, lamps, and lighting systems.

The method can be executed by the operating device, the lamps, or the lighting system according to an exemplary embodiment.

Devices and methods according to exemplary embodiments can be used, in particular, for a lighting system in which the light source comprises a light emitting diode (LED) or numerous LEDs, and the operating device is supplied with a DC supply voltage via a DC bus.

Further features, advantages and functions of exemplary embodiments of the inventions shall become clear from the following detailed description, based on the attached drawings, in which identical or similar reference symbols indicate units having the same or similar functions.

DETAILED DESCRIPTION

Figure 1:
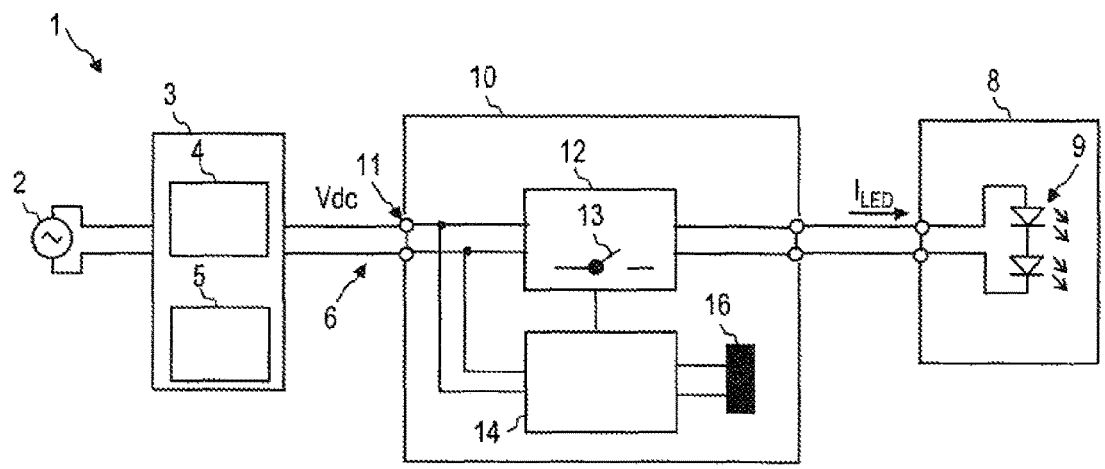
FIG. 1 shows a lighting system having an operating device according to an exemplary embodiment of the invention.

FIG. 1 shows a system 1 having a central processing unit 3, a DC bus 6, an operating device 10, and an LED module 8, which comprises numerous light emitting diodes (LEDs) 9. The LEDs 9 can be inorganic LEDs or organic LEDs.

Figure 2:
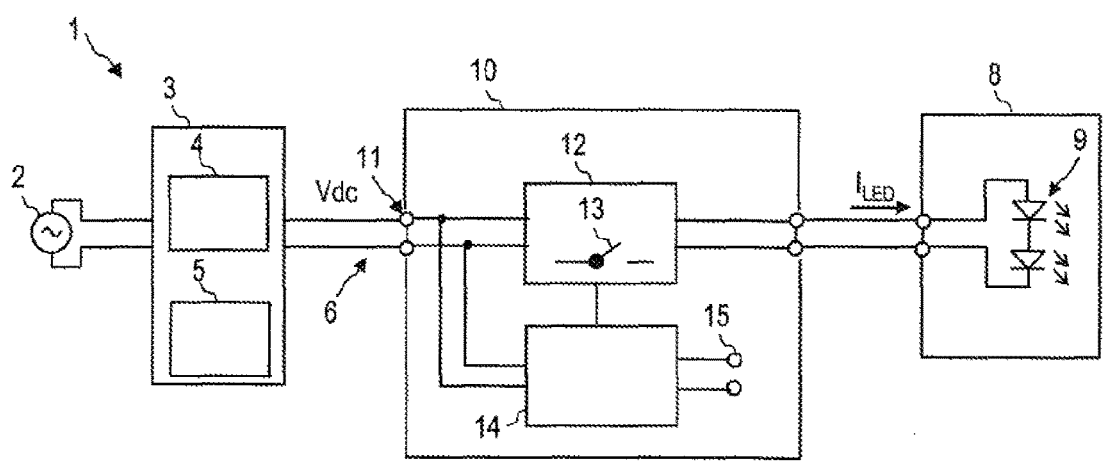
FIG. 2 shows the lighting system from FIG. 1, when the operating device has an emergency light function configured differently than in FIG. 1.

FIG. 2 shows the same system 1, when the emergency light function is configured differently than in FIG. 1. Even though only one operating device 10 and one LED module 8 assigned thereto are depicted schematically in FIG. 1 and FIG. 2, numerous operating devices could be connected to the DC bus 6 in order to generate an LED current for an LED module connected to its output.

The central unit 3 comprises a supply circuit 4, which is designed to receive an AC voltage from an AC voltage source in normal operation, and to generate a DC supply voltage for the operating device 10. The supply circuit 4 can comprise an AC/DC converter. The supply circuit 4 can comprise a potential separation, in order to provide a voltage to the DC bus 6 in the SELV ("Separated Extra Low Voltage") range, and to separate the DC bus 6 galvanically from an input side of the supply circuit 4.

The system 1 comprises an energy storage unit 5. The energy storage unit 5 can serve as a voltage source in an emergency light situation. In particular, an emergency light situation is regarded as a situation in which the AC voltage source 2, e.g. the supply voltage, is down. The energy storage unit 5 can be a battery or a rechargeable battery. The energy storage unit 5 can be a lead battery. The energy storage unit 5 can be rechargeable. The energy storage unit 5 can be designed to maintain a DC supply voltage at the DC bus 6 in an emergency light situation, in order to supply some or all of the operating devices connected to the DC bus 6 with power.

The operating device 10 according to an exemplary embodiment is designed to provide an LED current $I_{LED}$ for the LED module 8. The operating device 10 can comprise a DC/DC converter 12, in order to regulate the LED current to a target value, or to otherwise adjust it. The DC/DC converter can be a clocked converter, wherein a controllable switch 13 is switched in a clocked manner, in order to generate the LED current for the LED module 8.

The operating device 10 has a configurable emergency light function. The LED current for the LED module 8 can be generated by the operating device 10 through the emergency light function, at least for a predefined time period, even in an emergency light situation, e.g. if the AC voltage source 2 has an outage. The amperage of the LED current can be reduced in an emergency light situation in comparison with that in normal operation, e.g. to a maximum of 10% of the maximum amperage in normal operation. By means of the configurability of the emergency light function, it can be determined whether the operating device 10 should provide the LED current at its output during an emergency light situation. By means of the configurability, it can be determined whether the operating device 10 is used for a lamp that contributes to emergency lighting, or for a lamp that is switched off in an emergency light situation.

The configurable emergency light function can be realized in a variety of ways. In exemplary embodiments such as those depicted in FIG. 1 and FIG. 2, an integrated semiconductor circuit 14 is designed to determine, depending on a circuit element of the operating device 10, whether the operating device 10 should generate the LED current in an emergency light situation. The circuit element can be a manually manipulable circuit element. By way of example, it can be determined whether the operating device 10 also generates the LED current in an emergency light situation by inserting or removing a jumper 16.

FIG. 1 shows a system 1 in which a jumper 16 is present. The integrated semiconductor circuit 14 can detect the presence of the jumper 16, e.g. by means of a voltage or resistance measurement. The jumper can be short-circuit plug. FIG. 2 shows the system 1 when the jumper 16 has not been inserted, and a receiver 15 for the jumper remains empty. The integrated semiconductor circuit 14 can detect the absence of the jumper 16, e.g. by means of a voltage or resistance measurement.

Through inserting or removing the jumper 16, the emergency light function of the operating device 10 can be configured such that an LED current is generated in the emergency light situation. By way of example, the integrated semiconductor circuit 14 can detect that the operating device 10 should also generate the LED current in an emergency light situation when the jumper 16 is inserted. When the jumper 16 is not inserted, the integrated semiconductor circuit can then detect that the operating device 10 should not generate an LED current, and be switched off. A reversed encoding can also be implemented, in which the presence of the jumper 16, which connects the two conductor paths, indicates that the operating device 10 should not generate an LED current in an emergency light situation, and be shut off. With this encoding, the absence of the jumper 15 would indicated that the operating device 10 should generate an LED current in an emergency light situation.

Numerous other designs of the operating circuit 10 may be used, in order to enable a determination of whether the operating circuit 10 should generate an LED current in an emergency light situation. By way of example, the operating circuit 10 can comprise a resistor, which can be set to at least two values. The resistor can be adjusted in a user-defined manner, e.g. by actuating a DIP switch. The integrated semiconductor circuit 10 can read out the set resistance, and determine whether the set resistance value indicates a configuration of the emergency light function, in which the operating device 10 should generate an LED current in an emergency light situation. Alternatively, or additionally, an adjustable capacitor or another manually manipulable circuit element can be provided, the at least two states of which encode whether or not the operating device 10 should generate an LED current in an emergency light situation.

The operating device 10 is designed such that the configuration of the emergency light function is persistent, and will be maintained, when the normal operation and the emergency light situation alternate one or more times. However, the operating device 10 can allow for a reconfiguration of the emergency light function, e.g. in that the jumper 16 is again removed, or replaced, a DIP switch is actuated, a resistance value of a resistor, or a capacitance of a capacitor, is modified in a user-defined manner, or a switch of the operating device 10 can, in the case of an emergency light situation, control the operating device 10 such that, selectively, an LED current is only generated in an emergency light situation, when the emergency light function of the operating device 10 is configured such that the operating device 10 should continue to supply an LED current in an emergency light situation. When the emergency light situation of the operating device 10 is configured such that the operating device 10 should continue to supply an LED current in an emergency light situation, the integrated semiconductor circuit 14 can control the operating device 10 such that an LED current is also provided in normal operation. An operating device 10, which provides the LED current for the LED module 8 in an emergency light situation, can also generate an LED current in the normal operation.

The functioning of the operating device 10 and in particular the DC/DC converter 12 can be different in the normal operation and the emergency light situation. In particular, the integrated semiconductor circuit 14 can switch the controllable switch 13 of the DC/DC converter 12, such that in the emergency light operation, the LED current has a lower amperage than in the normal operation. If the operating device is designed to enable dimming, the integrated semiconductor circuit 14 can switch the controllable switch 13 of the DC/DC converter 12, such that in the emergency light operation, the LED current has a lower amperage than the amperage at 100% dimmer level, i.e. the maximum amperage in the normal operation.

The operating device 10 can also be designed to function with different DC input voltages in the normal operation and the emergency light situation. By way of example, the DC supply voltage at the DC bus 3 in normal operation can be higher, or alternatively, lower, than in the emergency light situation.

The integrated semiconductor circuit 14 can modify the clocked switching of the controllable switch 13, depending on whether the operating device 10 is currently in the normal operation or in the emergency light operation, such that the existing difference in amperages of the LED current and/or in the input voltages between the operating modes is taken into account.

The operating device 10 can fulfill further functions. When the operating device 10 is designed such that it can be dimmed, the integrated semiconductor circuit 14 can read out a dimming command, for example, and adjust a current regulation to the dimmer level to which it has been newly adjusted by means of a dimming command. The dimming command can be transmitted via the DC bus 6 as a so-called PLC ("Power Line Communication"). The operating device 10 can have a PLC demodulator for demodulating AC signals modulated on the DC supply voltage, with which dimming commands are encoded. The operating device 10 can also be designed for transmission of data via the DC bus 6. The data can be data relevant to diagnoses, e.g., data regarding irregular operating states such as faulty switch-offs. The data can be transmitted via the DC bus 6. The operating device 10 can comprise a PLC modulator for modulating AC signals to the DC bus 6, in order to transmit the data.

Figure 3:
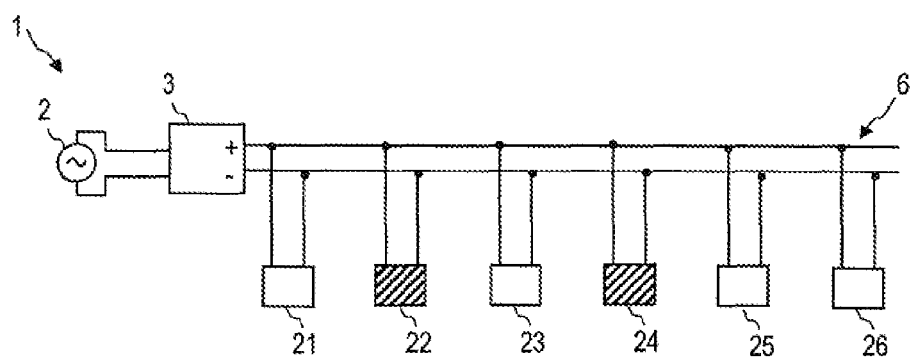
FIG. 3 shows a lighting system having numerous lamps according to an exemplary embodiment.

FIG. 3 shows a system 1 having numerous lamps 21-26, each of which is connected to the DC bus 6. Each of the lamps 21-26 has an operating device 10 according to an exemplary embodiment, and at least one light emitting diode. The emergency light function is configured in the operating devices 10 of one or more of the lamps 22, 24, such that the corresponding lamps 22, 24 emit light when in the emergency light situation, because the operating device 10 supplies the LEDs with the LED current. The emergency light function is configured in the operating devices 10 of one or more other lamps 21, 23, 25, 26, such that the corresponding lamps 22, 24 emit no light in an emergency light situation, because the operating device 10 does not supply the LEDs with the LED current.

Figure 4:
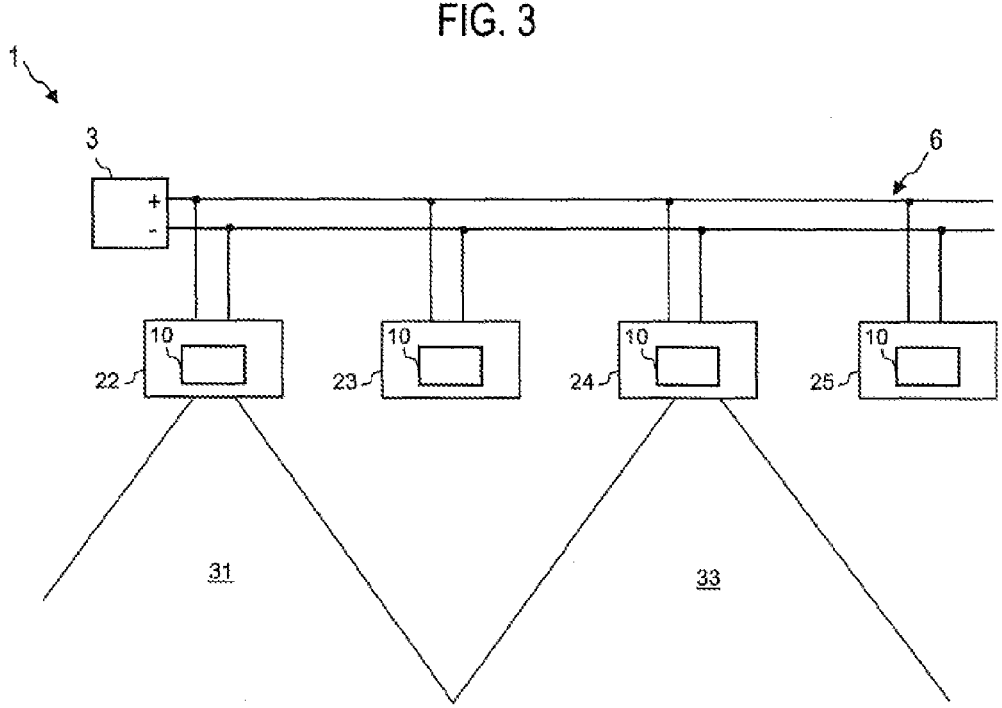
FIG. 4 illustrates an operation of the lighting system from FIG. 3 in an emergency light situation.

FIG. 4 shows a schematic side view of the system 1 in an emergency light situation. The lamps 22-25 may be wall or ceiling lamps for a building lighting system. The lamps 22-25 can be installed in a building.

Due to the configuration of the emergency light function of the operating device 10 of the lamps 22, 24, these operating devices 10 provide the LED current for the LEDs in an emergency light situation, such that the LEDs emit light 31, 33.

Due to the configuration of the emergency light function of the operating device 10 of the other lamps 23, 25, these operating devices 10 do not provide LED current for the LEDs in an emergency light situation, such that the LEDs of the other lamps 23, 25 do not emit light in an emergency light situation.

Through the configuring of the emergency light functions of the operating devices, a lighting design for an emergency lighting can established. It is possible, but not absolutely necessary, to control the different operating devices 22-25 through control commands addressed to the different operating devices, such that the appropriate light pattern is generated. Due to the configurable emergency light function, a change in the voltage level, for example, or a signal transmitted to all of the operating devices simultaneously via the DC bus 6, can indicate that there is an emergency light situation. In response thereto, the operating devices 10 of the lamps 22, 24 reduce the LED current for an emergency light operation, while the operating devices 10 of another portion of the lamps 23, 25 do not generate an LED current any more, and are shut off, or go into a standby mode.

Numerous other variations of operating devices, lamps, and systems according to exemplary embodiments could be implemented. By way of example, the emergency light function of an operating device can also be programmed via an interface.

Figure 5:
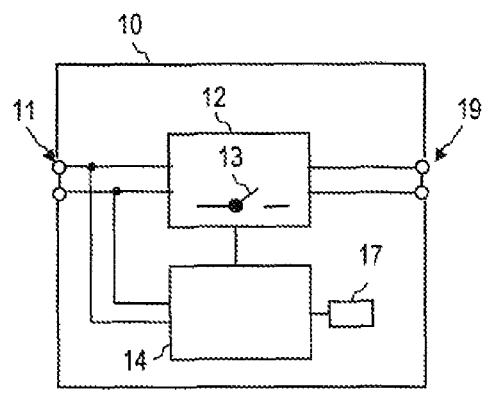
FIG. 5 is a schematic depiction of an operating device according to another exemplary embodiment.

FIG. 5 shows an operating device 10 according to another exemplary embodiment. The operating device 10 is designed such that the emergency light function can be configured via programming at the input 11, which is connected to the DC bus 6 when the operating device 10 has been installed. The integrated semiconductor circuit 14 can monitor signals received at the input 11, with which the emergency light function can be configured. By way of example, an AC voltage signal at the input 10 having a first frequency can indicate that the emergency light function of the operating device 10 is to be configured such that the operating device 10 generates an LED current in an emergency light situation. An AC voltage signal at the input 10 having a second frequency can indicate that the emergency light function of the operating device 10 is to be configured such that the operating device 10 does not generate LED current in an emergency light situation. Other forms of programming are possible. By way of example, a first binary sequence can be transmitted to the integrated semiconductor circuit via voltage signals received at the input 10, which indicates that the emergency light function of the operating device 10 is to be configured such that the operating device 10 generate an LED current in an emergency light situation. A second binary sequence can be transmitted to the integrated semiconductor circuit via voltage signals received at the input 10, which indicate that the emergency light function of the operating device 10 is to be configured such that the operating device 10 does not generate LED current in an emergency light situation.

The operating device 10 can have a memory 17 storing whether or not the emergency light function is configured for the operating device 10 to generate an LED current in an emergency light situation. The memory 17 can be a non-volatile memory.

An interface other than the input 11 can also be used to program the operating device 10.

Figure 6:
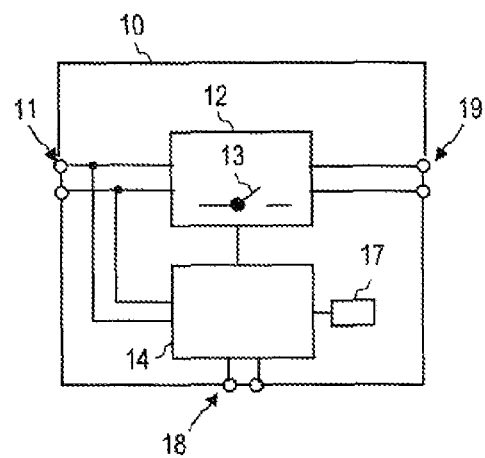
FIG. 6 is a schematic depiction of an operating device according to another exemplary embodiment.

FIG. 6 shows an operating device 10 according to another exemplary embodiment. The operating device 10 is designed such that the emergency light function can be configured at an interface 18 via a programming. The interface 18 differs from the input 11, which is connected to the DC bus 6 in the installed state. The interface 18 can be a programming interface for the operating device, which is not used when the operating device 10 is in the installed state. The interface 18 can also be a sensor interface, to which a sensor can be connected when the operating device 10 is in the installed state, and which is used temporarily for configuring the emergency light function, in order to program the operating device 10. The programming can occur as described in reference to FIG. 5.

Figure 7:
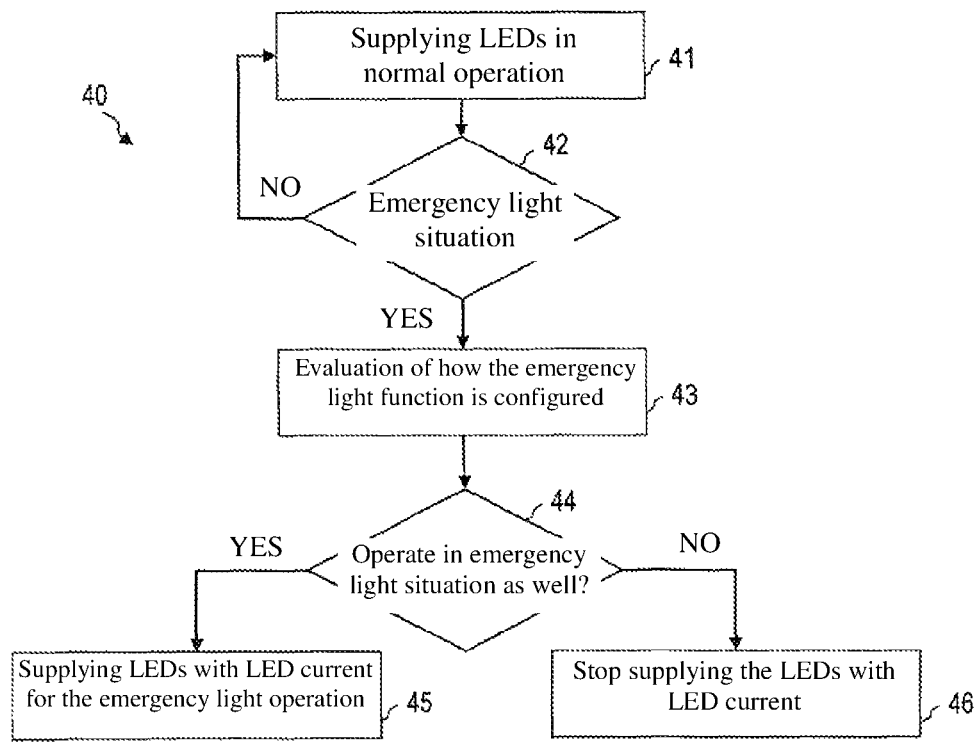
FIG. 7 is a flow chart of a method that is executed by an operating device according to an exemplary embodiment.

FIG. 7 is a flow chart of a method 40 that is executed by an operating device 10 according to an exemplary embodiment.

In step 41, the operating device 10 supplies the LEDs with LED current in normal operation. In step 42, the operating device 10 determines whether there is an emergency light situation. The detection of the emergency light situation can occur, for example, by monitoring the voltage at the input 11 coupled to the DC bus 6. If there is no emergency light situation, the supplying of current to the LEDs in normal operation continues in step 41

If an emergency light situation is detected, the operating device 10 determines how the emergency light function of the operating device is configured in step 43. For this, the integrated semiconductor circuit 14 can query the status of a switch element, e.g. the jumper 15, and/or read out indicator for the set configuration from a non-volatile memory 17.

In step 44, it is checked whether the LED current should also be provided in an emergency light situation in accordance with the configuration of the emergency light function. If the emergency light function is configured such that the LED current is also to be provided in an emergency light situation, the LEDs are supplied with an LED current for the emergency light operation in step 45. An amperage of the LED current can be reduced in comparison to the normal operation.

If it is determined in step 44 that the emergency light function is configured such that the LED current is no longer to be provided in an emergency light situation, the generation of the LED current is terminated in step 46. The operating device can go into a standby mode, or shut off.

Figure 8:
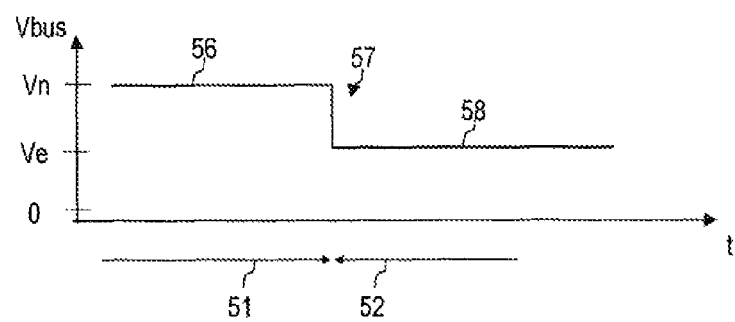
FIG. 8 illustrates the detection of an emergency light situation by monitoring a bus voltage according to an exemplary embodiment.
Figure 9:
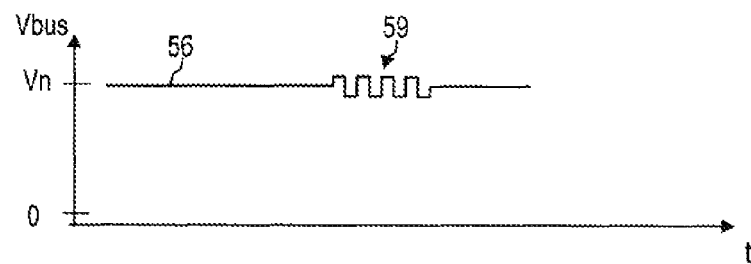
FIG. 9 illustrates the detection of an emergency light situation by monitoring a bus voltage according to another exemplary embodiment.

The operating device 10 can detect the emergency light situation in different ways, as shall be described in reference to FIG. 8 and FIG. 9.

FIG. 8 shows a voltage at the DC bus 6 of a system according to an exemplary embodiment, when there is an emergency light situation. In time interval 51, the system is functioning in the normal operation, and the DC supply voltage has a voltage level 56. In the emergency light situation, the DC supply voltage at the DC bus 6 drops to another voltage level 58, which is lower than the voltage level 56. The integrated semiconductor circuit 14 of the operating device 10 detects the dropping voltage edge 57 and determines from this that there is an emergency light situation. The end of the emergency light operation can be detected through a rising voltage edge at the DC bus 6.

The different voltage levels 56, 58 at the DC bus in the normal operation and in the emergency light operation could result, for example, because the output voltage of the energy storage unit 5 is lower than the voltage level of the DC supply voltage generated by the central processing unit 3 in the normal operation. By way of example, a DC supply voltage of up to 60 volts, e.g. a voltage of 48 volts, may be present at the DC bus 6 in normal operation. In the emergency light situation, the DC supply voltage can be reduced to 24 volts or 12 volts, for example.

The different voltage levels 56, 58 can be set by the central processing unit 3, in order to indicate the start and finish of the emergency light operation.

In another exemplary embodiment, the DC supply voltage at the DC bus 6 can be raised to another voltage level in the emergency light situation, which is higher than the voltage level 56. The integrated semiconductor circuit 14 of the operating device 14 can detect the rising voltage edge 57, or the increase in the voltage level, and determine from this that there is an emergency light situation. The end of the emergency light situation can be detected by a declining voltage edge, or the lowering of the voltage level at the DC bus 6.

The different voltage levels at the DC bus 6 in the normal operation and the emergency light operation could result, for example, because the output voltage of the energy storage unit 5 is greater than the voltage level of the DC supply voltage generated by the central processing unit 3 in normal operation. By way of example, in normal operation, a DC supply voltage of 24 volts or 48 volts, for example, may be present at the DC bus 6. In the emergency light operation, the DC supply voltage can be increased to 48 volts or 55 volts, for example.

The different voltage levels can be set by the central processing unit 3, in order to indicate the start and finish of the emergency light operation.

FIG. 9 shows a voltage at the DC bus 6 of a system according to an exemplary embodiment, when there is an emergency light situation. The central processing unit 3 can modulate an AC signal 56 to the DC supply voltage, in order to indicate that there is an emergency light situation. The integrated semiconductor circuit 14 of the operating device 14 can detect the AC signal 59, and determine therefrom that there is an emergency light situation. Depending on how the emergency light function is configured in the corresponding operating device 10, the generation of the LED current can be terminated, or the LED current can be generated with a lower amperage for supplying the LEDs. The end of the emergency light operation can be indicated by another AC signal at the DC bus 6.

Figure 10:
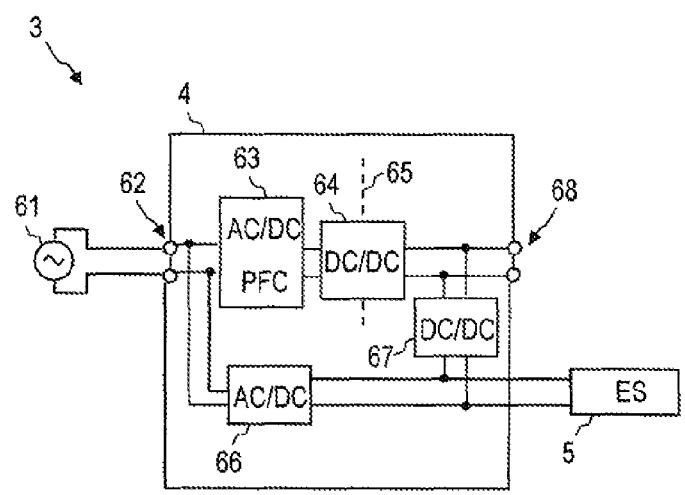
FIG. 10 shows a central processing unit of a lighting system according to an exemplary embodiment.

FIG. 10 is a depiction of the central processing unit 3 according to an exemplary embodiment. The central processing unit 3 comprises a supply circuit 4 having an input 62, which is coupled to an alternating current voltage source 61, e.g. the supply voltage. The supply circuit 5 can also be designed such that it can be coupled to a photovoltaic element.

The supply circuit 4 is designed to generate a DC supply voltage, and to supply the operating device 10 with power via the DC bus 6. The supply circuit 4 can comprise a rectifier and a power factor correction circuit 63. The supply circuit 4 can have a DC/DC converter with a potential (i.e. galvanic) separation, in order to provide a potential (i.e. galvanic) barrier 65. The potential (i.e. galvanic) barrier 65 can be an SELV barrier.

An energy storage unit 5, which can be a rechargeable energy storage unit, can be connected to the supply circuit 4 or be integrated therein. It is also possible to provide the energy storage unit separately from the supply circuit 4.

The supply circuit 4 can be designed for charging the energy storage unit 5 or discharging the energy storage unit via the DC bus 6 in an emergency light situation. The supply circuit 4 comprises an AC/DC converter 66 to generate a direct current for charging the energy storage unit 5. The supply circuit 4 comprises a DC/DC converter 67, which is operated in an emergency light situation to provide a DC supply voltage at the DC bus. As is depicted in FIG. 10, the supply circuit 4 provides a DC supply voltage at an output 68 in both the normal operation and in the emergency light situation. The DC supply voltage can have different voltage levels in the normal operation and in the emergency light operation.

While exemplary embodiments have been described with reference to the Figures, variations may be used in other exemplary embodiments. By way of example, an emergency light function of the operating device can also define more than two possible states. This would make it possible to define other configurations, in addition to, or as an alternative to, a first configuration in which the operating device only generates the LED current in the normal operation, and a second configuration in which the operating device generates the LED current in both the normal operation as well as in the emergency light situation. By way of example, a third configuration can be established, in which the operating device only generates the LED current in an emergency light situation.

In addition to, or as an alternative to, a programming of the operating device via an interface in the installation of the operating device, the emergency light function can also be configured when the operating device has already been installed. The emergency light function can occur in a PLC via the DC bus, wherein the corresponding control signals contain address data for an operating device.

Devices and methods according to exemplary embodiments can be used, in particular, for operating light sources that comprise LEDs.

What is claimed is:

1. An operating device for a lamp having at least one light emitting diode (9), wherein the operating device comprises:
   an input (11) for coupling to a DC bus (6) for receiving a DC supply voltage, via which the operating device (10) can be supplied with power via the DC bus in a normal operation as well as in an emergency light situation;
   an output that provides LED current to the one or more light emitting diodes in the lamp under normal operation; and
   a configurable emergency light function; wherein the operating device (10) controls LED current to the at least one light emitting diode (9) in the lamp during an emergency light situation depending on how the emergency light function is configured.

2. The operating device according to claim 1, wherein the configurable emergency light function can be selectively configured so that the operating device (10) does not supply LED current to the one or more light emitting diodes in the lamp in an emergency light situation.

3. The operating device according to claim 1, wherein the emergency light function can be selectively configured via at least one switch element (15) of the operating device (10).

4. The operating device according to claim 3, wherein the at least one switch element is selected from a group composed of a jumper (16), an adjustable resistor and an adjustable capacitor.

5. The operating device according to claim 1, wherein the operating device (10) has an interface (11; 18) for receiving a command for selectively configuring the emergency light function.

6. The operating device according to claim 1, further comprising an integrated semiconductor circuit (14), which is designed do detect an emergency light situation, and to control the operating device (10) in the emergency light situation; depending on how the emergency light function is configured.

7. The operating device according to claim 6, wherein the integrated semiconductor circuit (14) is connected to the input, and is designed to detect the emergency light situation through monitoring a voltage at the input (11).

8. The operating device according to claim 6, further comprising a DC-DC converter (12) with a controllable switch (13), wherein the integrated semiconductor circuit (14) is designed to switch the controllable switch (13) in a clocked manner in an emergency light situation; in order to generate the LED current when the emergency light function is selectively configured for the operating device (10) to provide LED current to the at least one light emitting diode of the lamp in the emergency light situation.

9. A lamp, comprising an operating device (10) according to claim 1, and at least one light emitting diode (9), which is connected to the output of the operating device (10).

10. A lighting system, comprising:
    a DC bus (6);
    a lamp comprising at least one operating device (10) according to claim 1 which is connected to the DC bus (6) and at least one light emitting diode (9) which is connected to the output of the operating device (10);
    an AC power source;
    a supply circuit that converts power from the AC power source to a DC supply voltage that is provided to the DC bus (6) during normal operation; and
    a backup emergency DC voltage source (5) for providing the supply voltage at the DC bus (6) in an emergency light situation.

11. A lighting system according to claim 10, wherein the lighting system comprises numerous lamps with operating devices (10) connected to the DC bus and having a configurable emergency light function, and wherein the emergency light function is configured in only a portion of the operating devices (22, 24) connected to the DC bus to supply LED current to the one or more light emitting diodes in respective lamp in an emergency light situation.

12. The lighting system according to claim 10, wherein the backup emergency DC voltage source comprises a battery or a rechargeable battery (5).

13. A method for an emergency light operation of numerous remote lamps connected to a DC bus where each lamp has at least one light emitting diode (9) and an operating device (10), said operating devices (10) each having an input (11) for coupling to the DC bus (6) to receive a DC supply voltage, an output for providing DC current to the at least one light emitting diode for the lamp, and a configurable emergency light function, wherein the method comprises:
   configuring an emergency light function for each operating device with a selected operational state during an emergency light situation;
   supplying each operating device with a DC supply voltage via the DC bus, the DC supply voltage being supplied to the DC bus by a central DC voltage source during normal operation and by an emergency backup DC voltage source in an emergency light situation when the central DC voltage source is not available;
   detecting the onset of an emergency light situation with each operating device (10); and
   controlling LED current from each operating device (10) to the at least one light emitting diode in each respective lamp when an emergency light situation is detected depending on the selected operational state of the emergency light function for the respective operating device.

14. A method according to claim 13 wherein where the DC supply voltage during normal operation is different than the DC supply voltage in an emergency light situation.

15. A method according to claim 13 wherein the selected operational state for a first set of lamps during an emergency light situation comprises an off state such that no LED current is supplied to the respective at least one light emitting diodes in the first set of lamps connected to the DC bus and the selected operational state for a second set of lamps during an emergency light situation is such that LED current is supplied to the respective at least one light emitting diodes in the second set of lamps connected to the DC bus during an emergency light situation.

* * * * *